(12) United States Patent
Shimizu

(10) Patent No.: US 6,857,750 B2
(45) Date of Patent: Feb. 22, 2005

(54) OFFSET PROJECTION FOR SLIM REAR PROJECTION DISPLAYS

(75) Inventor: Jeffrey Shimizu, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 17 days.

(21) Appl. No.: 10/183,799

(22) Filed: Jun. 27, 2002

(65) Prior Publication Data

US 2004/0001254 A1 Jan. 1, 2004

(51) Int. Cl.[7] .............................................. G03B 21/14
(52) U.S. Cl. ...................................... 353/69; 353/70
(58) Field of Search ........................ 359/457; 353/69, 353/70, 74–77, 101

(56) References Cited

U.S. PATENT DOCUMENTS

| | | | |
|---|---|---|---|
| 4,439,027 A | 3/1984 | Shioda et al. .................. 353/77 |
| 5,278,595 A | 1/1994 | Nishida et al. ................ 353/78 |
| 5,355,188 A | * 10/1994 | Biles et al. .................... 353/69 |
| 5,390,084 A | * 2/1995 | Ohtake et al. ................. 362/16 |
| 5,734,447 A | 3/1998 | Loiseaux et al. .............. 349/5 |
| 5,758,940 A | 6/1998 | Ogino et al. .................. 353/38 |
| 5,803,567 A | * 9/1998 | Nakanishi ..................... 353/74 |
| 5,836,664 A | * 11/1998 | Conner et al. ................. 353/70 |
| 5,914,818 A | 6/1999 | Tejada et al. ................. 359/663 |
| 6,485,145 B1 | * 11/2002 | Cotton et al. ................. 353/69 |

FOREIGN PATENT DOCUMENTS

| | | | | |
|---|---|---|---|---|
| EP | 0772077 A2 | 5/1997 | .......... G03B/21/62 |
| EP | 1143744 A2 | 10/2001 | .......... H04N/9/31 |
| JP | 06350947 A | 12/1994 | .......... H04N/5/74 |
| JP | 6-350947 | * 12/1994 | .......... H04N/5/74 |
| JP | 07248535 A | 9/1995 | .......... G03B/21/28 |
| WO | WO9418791 | 8/1994 | .......... H04N/5/74 |
| WO | WO0207434 | 1/2002 | .......... H04N/5/74 |

OTHER PUBLICATIONS

Machine translation of JP 06-350947.*
LG Electronics Inc: " Thin projection system," KR-2001073285 A, Publ. Date Aug. 1, 2001.

* cited by examiner

Primary Examiner—Christopher Mahoney

(57) ABSTRACT

An offset rear projection display system for displaying an image of an object as a projected image includes a projection lens optically offset from the center of the object, a screen including a light spreading layer, and a mirror disposed to reflect the projected image of the object projected by the projection lens onto the screen.

20 Claims, 5 Drawing Sheets

OFFSET PROJECTION FOR SLIM REAR PROJECTION DISPLAYS

FIELD OF TECHNOLOGY

The invention relates to rear projection display systems, and more particularly to rear screen projection television displays.

BACKGROUND AND SUMMARY

Rear screen projection television displays have found great consumer interest due to a large image size. A primary disadvantage is the set volume and depth. There is great desire to reduce set size but this is practically difficult and or costly with present CRT based projection systems.

Micro-display based systems such as LCD, DMD, or LCOS can achieve much smaller system volume than for CRT projection displays. This is due to a smaller engine size and projection from a single projection lens as opposed to three for CRT systems. Very attractive system dimensions have been announced for these systems. Recent product announcements include a 55-inch diagonal wide screen set with a system depth of 18 inches, and a 50-inch diagonal wide screen set with a depth of 35 cm. In these systems, narrow depth is obtained by using a wide-angle projection lens. However, there is a physical limit as to how narrow wide screen systems can be using this method, before the projection system begins to obscure the light path.

Other approaches to reduced system depth include using a polarized folded path (U.S. Pat. No. 573,324), and use of an off-axis aspherical mirror. Both approaches have difficulties that result in reduced picture performance and increased system cost. Furthermore, the height of the sets must be significantly greater to use these concepts.

It is advantageous to reduce system depth beyond what is possible with present art on-axis projection systems. Projection systems become dramatically more attractive as the system depth and height are reduced. New micro-display technologies, such as LCD, DMD, and LCOS, are able to reduce system volume significantly and this should help drive consumer acceptance. As compact dimensions are achieved with present approaches there will be great pressure to reduce system volume even more.

By introducing optical offset into the projection path the set depth can be reduced while maintaining a modest pedestal height. By "optical offset" of a lens or lens system from an object, is meant that the optical axis of the lens or lens system passes a distance (the offset) away from the center of the object. The term "optical axis" of a lens or lens system is well understood in the art; its direction may change depending on reflective or refractive elements placed in its path. For example, a projection lens is optically offset from an object whose image it is projecting, if the projection lens' optical axis (in either direction) does not pass through the center of the object.

Shifting the projection lens vertically creates an optical offset. The image then strikes the viewing screen with an offset angle. To compensate for this angle the Fresnel lens of the viewing screen is correspondingly offset so that the image exits the screen normally.

Rear projection systems typically use short focal length projection lenses, which are placed on-axis. The short focal length results in a short throw distance from lens to screen, which leads to compact system dimensions. Further, the lens is placed on-axis. That is, the rotational axis of symmetry for the projection lens intercepts the image device at the center of the picture. The viewing screen typically consists of a Fresnel lens to largely collimate the light, and a light spreading layer for distributing the light in the viewing space. Light from the center of the image strikes the screen at normal incidence. Thus the optical axis of the Fresnel lens is substantially coincident with the optical axis of the projection lens.

Accordingly, in one aspect of the invention, an offset rear projection display system for displaying an image of an object as a projected image includes a projection lens optically offset from the center of the object, a screen including a light spreading layer, and a mirror disposed to reflect the projected image of the object projected by the projection lens onto the screen.

In another aspect of the invention, a rear projection method that displays an image display of an object onto a screen includes arranging a projection lens to be optically offset from the object, projecting an image of the object from the optically offset projection lens onto a mirror, and reflecting the image off the mirror and onto the screen.

In yet another aspect of the invention, a display system for projecting an image of an object includes a screen and light projection means for projecting the image of the object onto the screen. The light projection means includes a projection lens optically offset from the center of the object.

BRIEF DESCRIPTION OF THE DRAWING FIGURES

The invention can be better understood with reference to the following drawing figures, in which.

DETAILED DESCRIPTION

Figure 1:
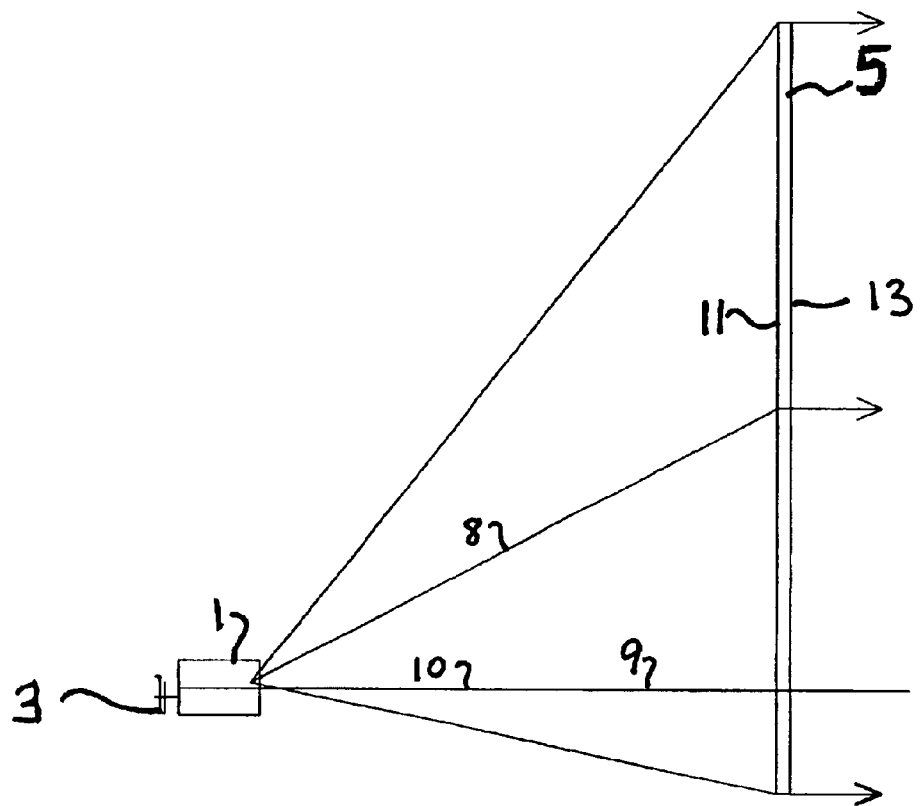
FIG. 1 illustrates an optical system configuration according to one aspect of the invention.

FIG. 1 illustrates an offset projection path according to the an embodiment of the invention. A projection lens 1 or projecting lens arrangement is offset from an object 3 whose image is to be projected. The projection lens 1 receives the image from the object 3 and projects the image to a rear-projection screen 5. The object 3 can be a physical object that radiates, reflects, or transmits light from its surface, or may itself be a projected image. In the illustrated embodiment the object 3 is a single panel LCOS device electronically operated to produce an image on its surface.

In an actual configuration utilizing light folding for reducing the size of a projection display cabinet, a fold mirror 7 (not shown in FIG. 1) would generally reflect light rays from the projection lens to the screen. In this explanatory figure the fold mirror has been removed for clarity, showing the light paths as they would be disregarding reflection. These include the center ray 8 of the image and the optical axis 10 of the projection lens 1 (i.e., the optical path of a light ray that leaves the projection lens 1 along the optical axis of the projection lens 1. Aside from the absence of the fold mirror 7, this would be a representative light path for a rear projection arrangement with a single fold mirror.

The projection lens 1, which could of course comprise multiple lens elements, is optically offset from the center of the object 3 or object image to be projected. The screen 5 includes a Fresnel lens 11 and a light spreading layer 13, which in this embodiment is a lenticular lens 13. The light spreading layer could also be a diffusion type layer, or any other material that acts to defuse or scatter light. The optical axis 9 of the Fresnel lens 11 in this embodiment of the invention coincides with the optical axis 10 of the projection lens 1. The center of the screen 5 is offset from the optical axis 10 of the projection lens 1 and the optical axis 9 of the Fresnel lens 11.

Figure 2:
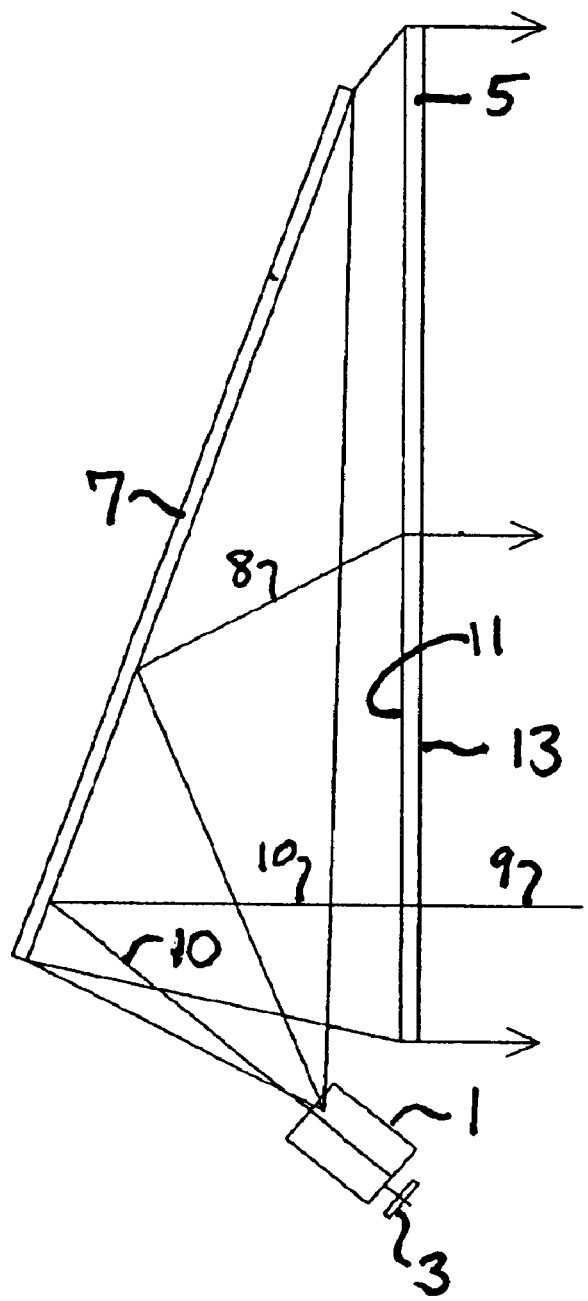
FIG. 2 illustrates use of the invention with a folded projection path.

FIG. 2 shows a representative embodiment of the projection path with the fold mirror 7 in place, so that a folded projection path for the projected image results, and illustrates the light path of the center ray 8 of the projected image. The mirror 7 is situated so that the optical axis 10 of the projection lens 1 and the optical axis 9 of the Fresnel lens 11 are coincident in the optical configuration given the reflection of the mirror 7.

Figure 3:
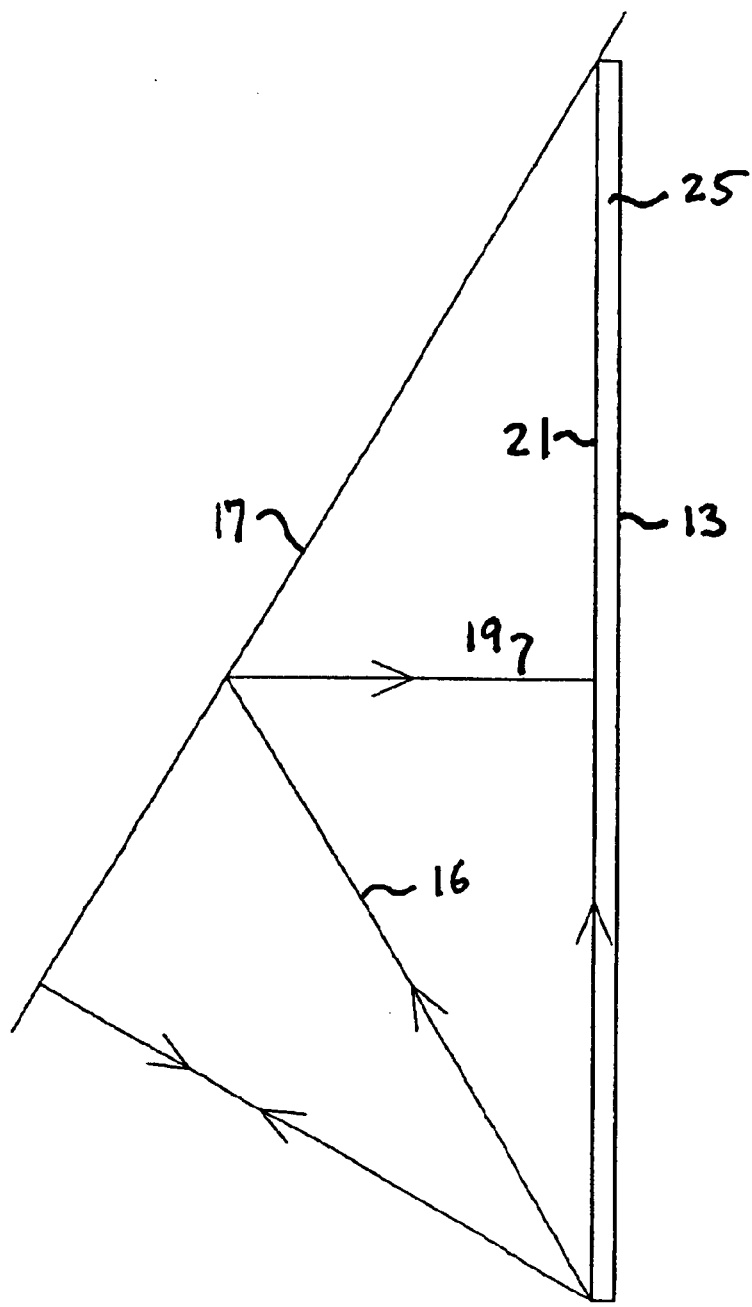
FIG. 3 illustrates limits to minimum folds for on-axis projection.

FIG. 3 shows an idealized example of an on-axis projection system, using a coaxial light engine (e.g., LCOS and projection lens having coincident axes) to project an image off a fold mirror 17 onto a screen 25 comprising a central-axis Fresnel lens 21 and a light spreading layer 13. In this example the optical axis 16 of the projection lens (not shown) and the optical axis 19 of the Fresnel lens 21 coincide.

Figure 4:
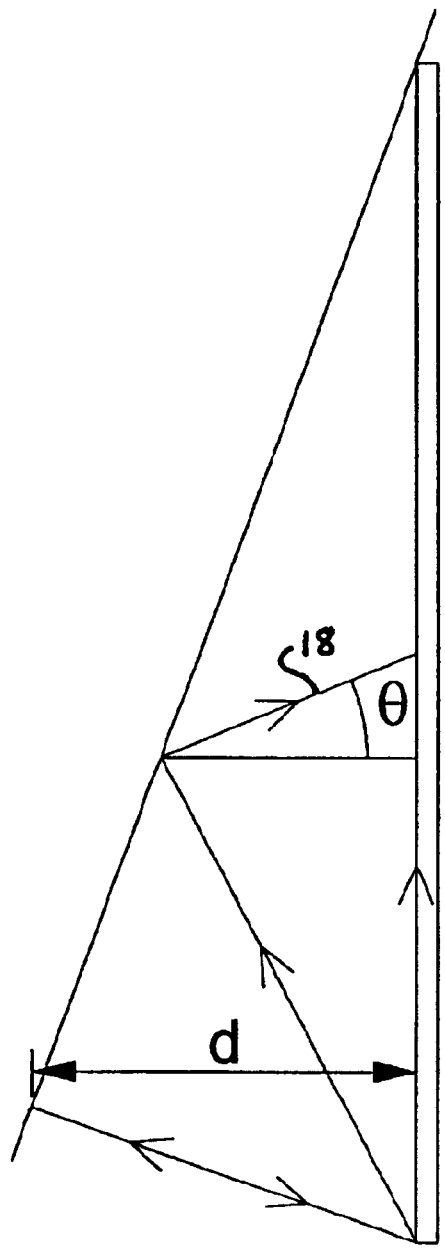
FIG. 4 illustrates limits to minimum folds for off-axis projection at an offset angle.

FIG. 4 shows an idealized embodiment of an off-axis projection system employing the invention, and indicates an offset angle θ for the center ray 18 of the projected image, and a theoretical minimum depth d for a cabinet containing the system.

Figure 5:
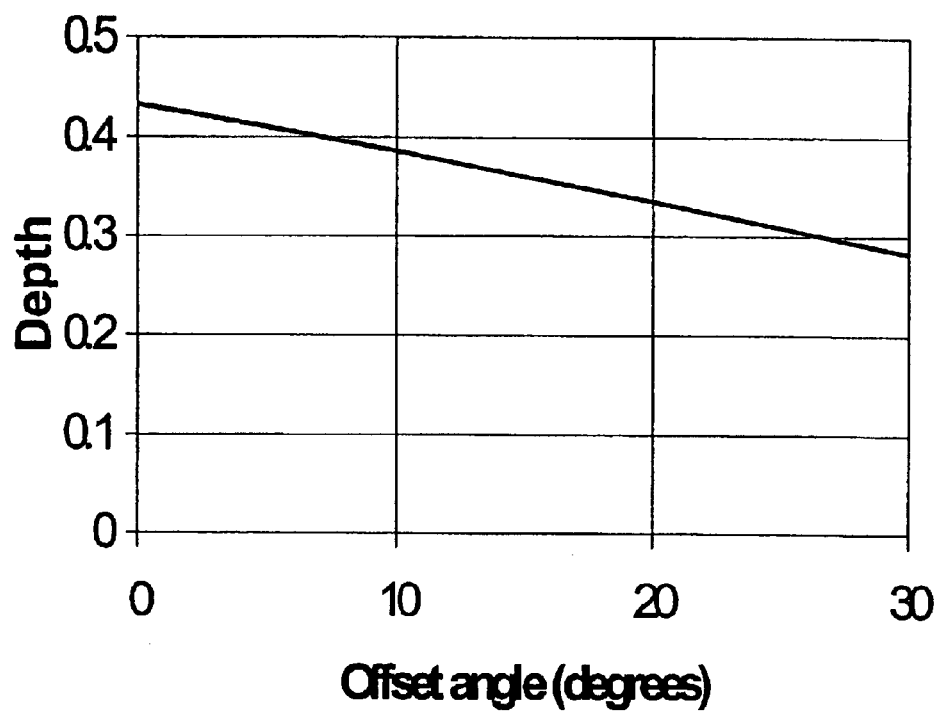
FIG. 5 is a plot of how the depth d of FIG. 4 varies as the offset angle θ changes.

FIG. 5 is a plot of how the depth d of FIG. 4 varies as the offset angle θ changes.

FUNCTIONAL APPLICABILITY

As can be seen from FIG. 1, a principal of operation of the invention is that since the optical axis 10 of the projection lens 1 is optically offset from the object (LCOS panel) 3, the projected image of the object 3 will not be centered about the optical axis 10 of the projection lens 1. Also, since the mirror 7 is placed so that the optical axis 9 of the Fresnel lens 11 is coincident with the optical axis 10 of the projection lens 1, the projected image of the object 3 will not be centered about the optical axis 9 of the Fresnel lens 11 when it arrives at the screen 5 after being reflected off the mirror 7, although the projected image may preferably be centered on the screen 5.

As a result of this configuration, the depth d of the display system can be smaller than it can be if the projected image were centered about the optical axis of the projection lens and Fresnel lens.

FIGS. 3 and 4 illustrate the gains that can be made with offset projection in reducing the physical limit of depth achievable with a single folded projection path. The projection path is made shorter by increasing the field angle of the projection lens. This can be done until the outgoing and reflected rays overlap. For on-axis projection this limit occurs with a 60-degree vertical full angle. This geometry is shown in FIG. 3. This is a theoretical limit which can not in practice be achieved since for example there is no physical room for the projection lens and image device.

A similar ray cone triangle is shown in FIG. 4 for the case of offset projection according to an embodiment of the invention. Here the offset angle for the center ray 18 of the projected image is θ. A plot of the depth, d, versus offset angle, θ, is shown in FIG. 5. So, for example, at the theoretical physical limit, depth d is reduced by a factor of 0.77 for a 20-degree offset angle. In this way, thinner rear-projection display systems can be constructed.

Other embodiments, variations of embodiments, and equivalents, as well as other aspects, objects, and advantages of the invention, will be apparent to those skilled in the art and can be obtained from a study of the drawings, the disclosure, and the appended claims. For example, the object 3 in the illustrated embodiment is an LCoS panel, but the invention encompasses projecting images of other objects as well. However, it should be understood in interpreting the claims that when speaking of the "object" whose image is to be projected, "object" may refer to only a portion of a larger object, i.e., the "object" of the claims is that portion which is to be displayed.

I claim:

1. An offset rear proljtion display system for displaying an image of an object as a projected image, comprising:
   a projection tens optically offset from the center of the object;
   a rear-projection screen including a light spreading layer;
   a mirror disposed to reflect the projected image of the object projected by the projection lens onto the screen; and
   a Fresnel lens,
   and wherein the projection lens, screen, and mirror are arranged such that;
   the optical axis of the projection lens arrives at the screen substantially coincident with the optical axis of the Fresnel lens, and
   the center of the projected image arrives at the screen substantially offset from the optical axis of the Fresnel lens.

2. The display system of claim 1, wherein the object is a single panel LCoS device.

3. The display system of claim 1, wherein the light spreading layer is of lenticular lens construction.

4. The display system of claim 1, wherein the Fresnel lens has an optical axis substantially offset from the center of the screen.

5. A rear projection method that displays an image display of an object onto a rear-projection screen, comprising:
   arranging a projection lens to be optically offset from the object;
   projecting an image of the object from the optically offset projection lens onto a mirror;
   reflecting the image off the mirror and onto the screen; and
   constructing the screen by placing a Fresnel lens adjacent a light spreading layer so that the optical axis of the Fresnel lens is substantially offset from the center of the screen,
   wherein the projected image is reflected off the mirror and onto the screen such that the center of the projected image arrives at the screen closer to the center of the screen than to the optical axis at the Fresnel lens.

6. The method of claim 5, including arranging the projection lens, mirror, and screen such that the projection lens is substantially optically aligned with the optical axis of the Fresnel lens.

7. The method of claim 6, wherein the object is a single panel LCoS device.

8. The method of claim 6, wherein the light spreading layer is of lenticular lens construction.

9. The method of claim 5, wherein the object is a single panel LCoS device.

10. The method of claim 5, wherein the light spreading layer is of lenticular lens construct on.

11. A display system for rear-projecting an image of an object, comprising:
   a rear-projection screen including a light spreading layer and a Fresnel lens having an optical axis substantially displaced from the center of the screen; and
   light projection means including a projection lens optically offset from the center of the object for off-axially projecting the image of the object onto the screen.

12. The display system of claim 11, wherein the projection lens is substantially optically aligned with the optical axis of the Fresnel lens.

13. The display system of claim 12, wherein at least one of the optical axle of the projection lens and the optical axis of the Fresnel lens is offset from the center of the screen.

14. The display system of claim 13, wherein the light spreading layer is of lenticular lens construction.

15. The display system of claim 13, wherein the object is a single panel LCoS device.

16. The display system of claim 12, wherein the optical axis of the projection lens and the optical axis of the Fresnel lens are both offset from the center of the screen.

17. The display system of claim 12, wherein the light spreading layer is at lenticular lens construction.

18. The display system of claim 12, wherein the object is a single panel LCoS device.

19. The display system of claim 11, wherein the light spreading layer is of lenticular lens construction.

20. The display system of claim 11, wherein the object is a single panel LCoS device.

* * * * *